July 1, 1924.
R. F. HALL
1,499,526
MACHINE FOR THE MANUFACTURE OF GLASS ARTICLES
Filed July 27, 1920
2 Sheets-Sheet 1
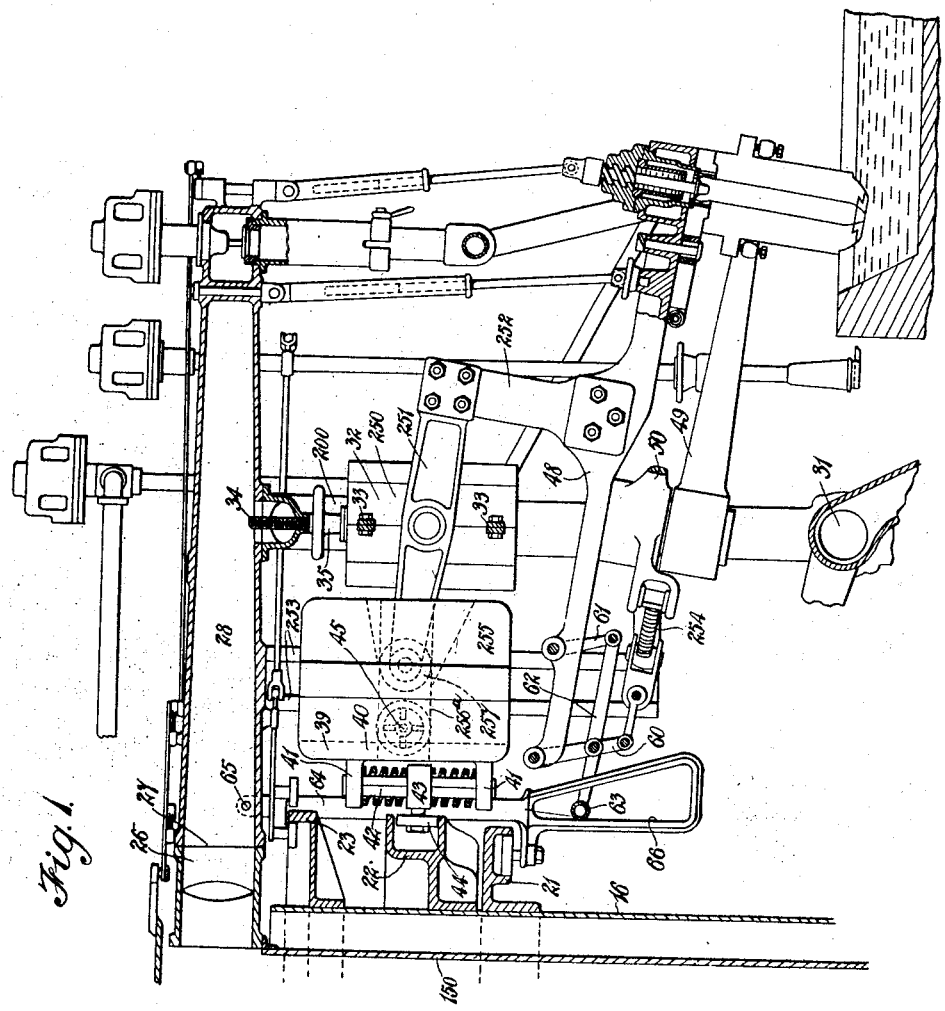
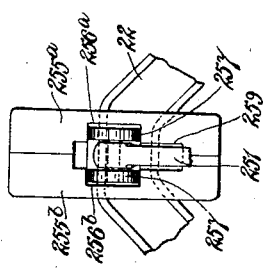
Inventor:
R. F. Hall
By his Attorneys,

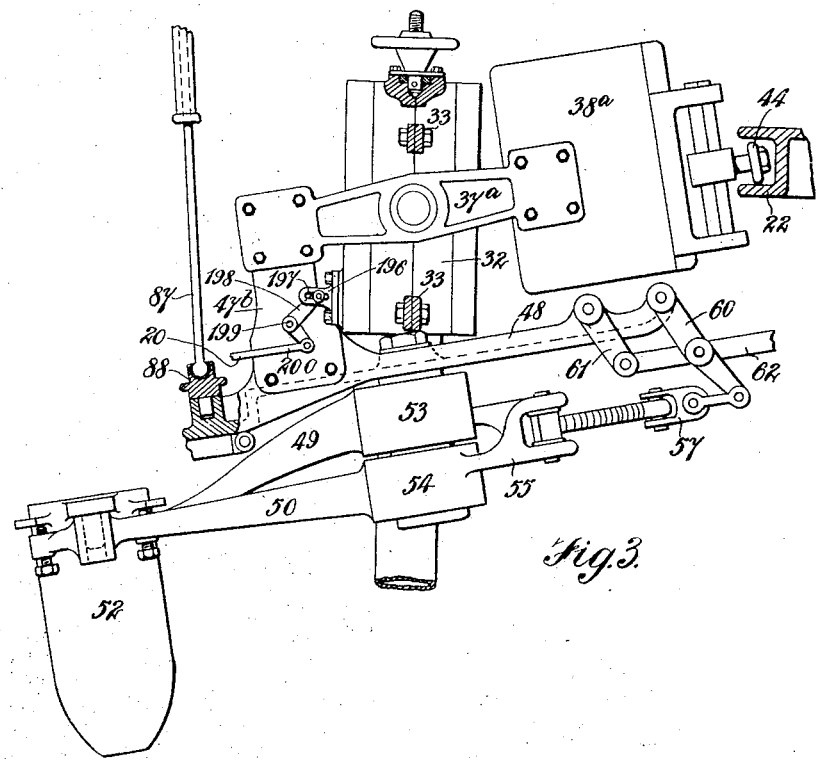

Patented July 1, 1924.

1,499,526

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

Application filed July 27, 1920. Serial No. 399,432.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, residing at Moseley, near Birmingham, in the county of Warwick, England, have invented certain new and useful Improvements in Machines for the Manufacture of Glass Articles (for which I have filed an application in Great Britain, No. 8769, filed Jan. 21, 1918), of which the following is a specification.

This invention relates to rotary machines for the manufacture of glass articles and refers to that type of such machines in which the molten glass from which the articles are to be formed is drawn by means of suction into a parison or equivalent mold, the said mold being open at the bottom and being lowered to the surface of the molten glass, to enable the glass to be drawn into the interior thereof: after which the mold is raised and the parison therein contained is carried through the various operations necessary for the production of the finished article.

In rotary machines of the foregoing type, it has already been proposed to mount, on a skeleton framework or spider, a series of parison molds, the frame being reciprocated vertically during the revolution, to dip the lower edge of each parison mold into the molten glass.

It has also been proposed to provide a principal rotating framework or spider, in which are mounted a number of frames, each frame carrying a parison mold and its auxiliary parts: to provide means for adjusting the height of each frame above the glass tank, and to counterbalance each frame and the auxiliary parts by means of a suitable weight: each such frame being lowered and raised vertically, while the machine continuously rotates by a lever connected with it and cooperating with a horizontal cam disc.

My present invention relates more particularly to the parison molds and their associated parts, and has for one of its objects to provide improved means for carrying, raising and lowering the said molds and associated parts.

A further object of the invention is to provide improved means for adjusting the height of the said molds, with respect to the molten glass, so as to allow for a greater range of adjustment than is possible with the machine as at present constructed.

Other objects of the invention will be referred to in the specification, as regards minor constructional details and arrangements.

According to my present invention, I provide a single lever of the first order, carrying the head and parison mold, rigidly connected thereto at the outer end, and operated from a cam or other device at the inner end.

In the preferred construction, the lever carries a counterbalance weight at the inner end, and the operation is effected from a vertical cam through the said counterbalance weight.

With this construction, if it is desired that the opening of the parison mold, when brought down to the level of the glass tank should be horizontal, it is inclined in such a way, that although not perfectly horizontal, when in the raised position it becomes horizontal when lowered, and the knife for cutting off the trailing glass must be suitably arranged.

As an alternative, the construction may be such that the opening is perfectly horizontal when the parison mold is raised as in that case it is only necessary to cause it to dip somewhat more deeply beneath the surface of the molten glass in the tank, when in the lowered position, in order to obtain an efficient result.

In order that my present invention may be more clearly understood, I will now proceed to describe the same with reference to the accompanying drawing, which shows more or less diagrammatically two applications of my invention to machines of the Owens type, for the manufacture of glass articles.

The machine, to which the present improvements are shown as applied, is moreover of the kind fully described in the specification of my co-pending application Ser. No. 399,427, filed July 27, 1820, in which said bottle making element or unit is mounted between an upper rotatable framework, preferably constituted by hollow radial arms serving as conduits for cooling air, and a lower rotatable ring.

Fig. 1 is a sectional elevation of one half of a rotary machine of the foregoing variety illustrating the mechanism of one of the units in connection with the parison mold and associated parts, according to one method of carrying the invention into effect.

Fig. 2 is a side view of the counterbalance weight.

Fig. 3 is a side elevation illustrating a modified construction.

The same numerals of reference are employed to denote the same parts in all the views, and in addition, the numerals of reference correspond, as far as possible with those employed in connection with the drawings accompanying the specification of my before mentioned co-pending application.

In the machine disclosed in my co-pending application, Ser. No. 399,427, hereinbefore referred to, there is shown a stationary frame supported on a truck upon which stationary frame, and about which rotates, a movable frame. The movable frame includes an upper portion comprising a series of radially extending arms connected with a common central portion or chamber, and at the lower portion of the movable frame is an annulus supported on antifriction means. Between the radial arms and the annulus are secured vertically extending columns, which are termed "bifurcated columns" and which are more fully described herein.

In the drawings, 16 shows the upper portion of the fixed hollow column, carrying the cam 21 for operating the opening and closing of the parison mold, the cam 22 at a higher level for operating the raising and lowering of the mold and the cam 23 at a still higher level for operating the knife.

28 is one of the hollow arms, extending radially from the chamber 26, and supported from a rotatable ring at the bottom of the machine by means of a vertical column, in the present case a bifurcated column 200, which carries at an upper level the parison mold lever and its associated mechanisms, about to be described, and at a lower level the finishing mold and its associated mechanisms, which in the present case may be assumed to be of the type described in my co-pending application.

Each of the arms 28 is bolted opposite an opening 27 in the face of the chamber 26, which chamber is polygonal in shape. Air is supplied through the central tube 150, the arrangement being such that the columns 200 carry the chamber 26 and the vertical tube 150 through the horizontal arms 28, so that the whole upper frame of the machine rotates about the fixed column 16 carrying the cam ways 21, 22 and 23.

The columns 200 are formed from castings of H section at the lower part and solid up to the height of the trunnions 31 for the finishing mold carrying arms, and from this position to the top they are hollow.

The inner surfaces of the upper portions of the bifurcated column are machined with plain parallel portions, between which is carried an adjustable framework 250. This framework consists of two parallel side members 32 adapted to fit against the inner surfaces of the bifurcated column and to be held in position against such surfaces.

These side members are connected by transverse members 33, and the upper transverse member has secured thereto a screw threaded rod 34 working into a screwed hole 34$^a$ in a boss provided on the bifurcated column. An operating hand wheel 35 is attached to the said rod 34, so that rotation of the said wheel causes the rod to rotate in the screwed hole, and the framework constituted by the members 32 and 33 to be raised and lowered for the purposes of adjustment.

Pivoted to the framework 32, 33 by means of suitable bearings is a lever 251 of the first order.

Rigidly bolted to the outer end of the lever 251 by means of a connecting arm or piece 252 is the frame or casting 48 carrying the parison mold and associated parts.

The parison molds are carried from a frame 48 by means of the arms 49 and 50, which are operated through the parallel link lever mechanism 60, 61, 62 from the roller 63, which is in turn operated from the hanging member 64 pivoted at 65 to the arm 28 and provided with a tapering slot 66 in which the cam roller 63 engages. The parison mold is operated through this mechanism which is controlled by a cam roller on the member 64 engaging in the cam groove 21.

The slot in the lower portion 66 is of a tapering form to allow for the vertical adjustment of the frame or casting in order to accommodate the machine for taking molds of different lengths.

It is not thought necessary in the present specification, to describe in detail the construction and operating mechanism for the neck mold and the knife, or the details of the head, as these are similar in construction to the corresponding parts described in my application already referred to.

253, 254, is a right angled frame, of which two are provided, one coming at each side of the inner end of the lever 252. These frames are bolted as to the member 253, at the top to the hollow arm 28 whilst the member 254 is bolted to the corresponding side of the bifurcated column 200.

The vertical members 253 constitute guides for the weight 255. This weight, which is shown in section at Fig. 2, is divided into or composed of two parts 255ª and 255ᵇ furnished with horizontally extending slots 256ª and 256ᵇ along which the rollers 257 carried at the inner end of the lever 251 are adapted to roll, as the weight 255 rises and falls.

In order to enable this action to take place, the inner portion of the weight is cut away at 259 to give clearance for the lever 251.

The weight 255 is provided at the inner edge 39 with a receptive machined slideway, within which is slidably mounted a strip 40 carrying at its ends two projecting lugs 41 connected to a bar 42. 43 is a ring slidable on the rod 42 and carrying the cam roller 44.

Between the lugs 41 and the ring 43 are mounted helical compression springs, as will be clearly seen from the drawing.

In order to lock the strip 40 in the required position in the channel 39, the edges of the weight 38 are made so that they can be drawn or clamped together by means of a screw 45 operated by a hand wheel.

The operation of the particular mechanism just described, will be readily understood.

The cam 22 is so shaped that it allows the counterbalance weight 251, which is slightly heavier than the parison mold and auxiliary parts at the other side of the fulcrum, to drop and to keep the head, the mold, and associated parts in the raised position, until it is required to lower them.

The camway 22 is, however so shaped that it raises the weight 251 when it is necessary to dip the mold opening into the glass in the tank. Thus the rollers 257 are pushed upwards and owing to the construction of the horizontal guideways 256ª 256ᵇ and the cut away portion 259 within the weight, the inner end of the said lever is pushed upwards and the frame 48 which is rigidly connected to the outer end of the said lever 251 is lowered until the opening of the mold is dipped beneath the surface of the glass in the tank. It is shown in this position in Fig. 1.

As soon as the roller 44 comes to a downwardly inclined portion of the camway 22, that is after the required interval for filling the mold, the mold is again raised automatically from the glass tank.

In order to adjust the vertical position of the lever 251 and consequently to enable the frame 48 to be raised or lowered to accommodate it for use with parison molds of different lengths, it is simply necessary to loosen the screw 45 in order to enable the strip 40 carrying the cam roller 44 to slide freely within the slideway 39 in the weight 251 and then to rotate the nut 35 to a sufficient extent to raise or lower the frame 48 to the required degree, by raising or lowering the sliding frame 32, 33 carrying the lever 251. When the frame 48 is in the required position, the screw 45 is again tightened and the weight is in the proper position.

At the same time the roller 63 in the operating mechanism of the parison mold arm has adjusted itself to the correct position in the slot 66 of the hanging member 64, and when the screw 45 is again tightened up, the cam roller is in the correct position with respect to the cam to effect the proper operation of the mold.

Fig. 3 shows diagrammatically a construction in which the weight is rigidly connected to the inner end of the lever carrying the parison mold and associated mechanism and in which the said weight is directly operated from the cam 22.

In this figure the casting 48 is carried by or formed with the bracket 47ᵇ secured to the outer end of the lever 37ª. The inner end of this lever has rigidly attached thereto the weight 38ª or it may be proportioned so as to constitute a counterbalance weight. 44 is a cam roller moving in the vertical camway 22 and adjustably secured to the weight 38ª in a manner analogous to that already described in connection with the prior construction illustrated at Fig. 1.

The framework 32, 33 carrying the pivoted lever may also in this case be fitted with means for raising and lowering it with respect to the bifurcated column or framework which carries it.

With all these constructions, as previously mentioned, owing to the fact that the parison mold 52 describes an arc, as it is lowered, the line of the opening also describes a certain amount of arc.

As a consequence it is necessary either to allow for this, so that the opening dips horizontally beneath the surface of the glass in the tank, or as an alternative care must be taken where the aperture is horizontal in the raised position that it is dipped when in the lowered position to a sufficient depth for the whole opening to be immersed below the surface of the glass in the tank.

In the preferred construction, again the lever carrying the parison mold and associated parts is mounted in a bifurcated column or its equivalent bolted to the radial arm at the top and to a rotatable ring at the bottom, and in this way it is easy by unbolting the bifurcated column at the bottom and detaching the arm from the rotatable chamber at the top, to remove a whole unit in a very short time without materially disturbing the working of the machine. This greatly facilitates repairs, as a new unit can be placed in position and the machine again started working, or if necessary the machine can be worked without the missing unit.

Although I have more particularly shown and described the counterbalanced lever as being operated by means of a vertical cam, I may operate the same from a horizontal cam by an electric solenoid, by a fluid pressure motor or by a combination of any, or all of such means.

In my application hereinbefore referred to, I have described, and in my co-pending application, Serial Number 399,429, filed July 27, 1920, I have described and claimed, a parison mold mechanism of somewhat similar construction in which the bottom of the parison mold is always maintained in a substantially horizontal position.

What I claim and desire to secure by Letters Patent of the United States of America is:—

1. A machine for forming glass articles comprising a stationary frame, a rotatable frame carried thereby, a vertically extending column on the rotatable frame, a lever pivotally supported between its ends by the column, a vertically movable weight connected to one end of the lever, a frame rigidly suspended from the other end of the lever, a parison mold carried on the frame, means for effecting a vertical movement of the weight to swing the parison mold in an arc, and means for effecting the operation of the parison mold.

2. A machine for forming glass articles including a stationary frame and a rotatable frame carried thereby, a lever pivotally supported by a portion of the rotatable frame and arranged to swing in an arc, means for effecting a swinging movement of the lever through an arc, a counterbalance connected with the lever, a parison mold carrying frame rigidly connected with the lever and arranged to swing in an arc therewith, a parison mold on the parison mold carrying frame, and means for effecting the operation of the parison mold.

3. A machine for forming glass articles including a stationary frame, a rotatable frame supported thereby, a vertically adjustable member guided in a portion of the rotatable frame, a lever pivotally carried by said vertically adjustable member, means for swinging the lever in a vertical plane through a limited arc, a parison mold carrying frame carried by the lever and arranged to swing in an arc therewith, a parison mold on the parison mold carrying frame, and means for operating the parison mold, said swinging movement of the parison mold carrying frame serving to raise and lower the parison mold, while effecting an adjustment of the vertically movable member adjusts the parison mold carrying frame vertically.

4. A machine for forming glass articles including a stationary frame, a rotatable frame supported thereby, a vertically adjustable member guided in a portion of the rotatable frame, means for effecting a vertical adjustment thereof, a lever pivotally supported between its ends on said vertically adjustable member, a counterbalance carried on one end of the lever, means for rocking the lever in a limited arc, a parison mold carrying frame on the other end of the lever and arranged to swing in an arc therewith, a parison mold carried by said parison mold carrying member, and means for operating the parison mold, said vertically movable member serving to adjust the parison mold and said lever serving to effect the dipping thereof.

5. A machine for forming glass articles including a stationary frame having a cam track thereon, a rotatable frame supported thereby, a vertically adjustable member guided in a portion of the rotatable frame, means for effecting a vertical adjustment thereof, a lever pivotally supported between its ends on said vertically adjustable member, a counterbalance carried on one end of the lever, means including a cam connected with the lever and engaging the cam track on the stationary frame for rocking the lever in a limited arc, a parison mold carrying frame on the other end of the lever and arranged to swing in an arc therewith, a parison mold carried by said parison mold carrying member, and means for operating the parison mold, said vertically movable member serving to adjust the parison mold and said lever serving to effect the dipping thereof.

6. A machine for forming glass articles comprising a stationary frame, a rotatable frame supported thereby, parison mold section carrying arms supported by the rotatable frame and arranged to be moved vertically and horizontally, means for adjusting the parison mold arms vertically relatively to the rotatable frame, and means for effecting the movement of the arms vertically, and other means for effecting the movement of the arms horizontally in any vertical position to which the arms are adjusted.

7. A machine for forming glass articles comprising a stationary frame, a rotatable frame supported thereby, parison mold section carrying arms supported by the rotatable frame and arranged to be moved vertically and horizontally, means for adjusting the parison mold arms vertically relatively to the rotatable frame, and means for effecting the movement of the arms vertically, and other means for effecting the movement of the arms horizontally in any vertical position to which the arms are adjusted, said means including a vertically extending swinging arm having a tapering guideway in the free end thereof in which is guided means connected with said arms and arranged to transmit motion from the vertical lever to the arms.

8. In a machine for the manufacture of glass articles, the combination of a fixed central column, a framework rotatable about the said central column, a lever of the first order pivoted to the said framework, a sectional parison mold, the sections of which are pivotally carried in fixed relation to the outer arm of the said lever, and means in connection with the inner arm of the said lever for lowering and raising the parison mold at appropriate times, for the purposes set forth.

9. In a machine for the manufacture of glass articles, the combination of a fixed central column, a framework rotatable about the said central column, a lever of the first order, pivoted to the said framework, a sectional parison mold, the sections of which are pivotally carried in fixed relation to the outer arm of the said lever, a counterbalance weight in connection with the inner end of the said lever, and means for lowering and raising the parison mold at appropriate times, for the purposes set forth.

10. In a machine for the manufacture of glass articles, the combination of a rotatable framework, a secondary frame adapted to slide vertically with respect to the said framework, in order to adjust the machine for different lengths of parison molds and for different levels of molten glass, means for adjusting the said secondary frame, and for retaining it in various vertical positions, a lever of the first order pivoted to the said secondary frame, a sectional parison mold, the sections of which are pivotally carried in fixed relation to the outer arm of the said lever, and means in connection with the inner arm of the said lever for lowering and raising the parison mold at appropriate times, for the purposes set forth.

11. In a machine for the manufacture of glass articles, the combination of a rotatable framework, a secondary frame adapted to slide vertically with respect to the said framework, in order to adjust the machine for different lengths of parison molds and for different levels of molten glass, means for adjusting the said secondary frame and for retaining it in various vertical positions, a lever of the first order pivoted to the said secondary frame, a sectional parison mold, the sections of which are pivotally carried in fixed relation to the outer arm of the said lever, a counterbalance weight in connection with the inner end of the said lever, and means in connection with the inner end of the said lever for lowering and raising the parison mold at appropriate times, for the purposes set forth.

12. In a machine for the manufacture of glass articles, the combination of a fixed central column, a framework rotatable about the said central column, a secondary frame adapted to slide vertically with respect to the said framework, in order to adjust the machine for different lengths of parison molds and for different levels of molten glass, means for adjusting the said secondary frame and for retaining it in various vertical positions, a lever of the first order pivoted to the said secondary frame, a sectional parison mold, the sections of which are pivotally carried in fixed relation to the outer arm of the said lever, and means in connection with the inner arm of the said lever for lowering and raising the parison mold at appropriate times, for the purposes set forth.

13. In a machine for the manufacture of glass articles, the combination of a fixed central column, a framework rotatable about the said central column, a secondary frame adapted to slide vertically with respect to the said framework, in order to adjust the machine for different lengths of parison molds and for different levels of molten glass, means for adjusting the said secondary frame and for retaining it in various vertical positions, a lever of the first order pivoted to the said secondary frame, a sectional parison mold, the sections of which are pivotally carried in fixed relation to the outer arm of the said lever, a counterbalance weight in connection with the inner arm of the said lever, and means in connection with the said inner arm of the said lever for lowering and raising the parison mold at appropriate times, for the purposes set forth.

14. In a machine for the manufacture of glass articles, the combination of a fixed central column, a framework rotatable about the said central column, a lever of the first order pivoted to the said framework, a sectional parison mold, the sections of which are pivotally carried in fixed relation to the outer arm of the said lever, a vertical box cam in fixed connection with the said central column, and a follower to said cam in connection with the inner arm of the said lever, for the purposes set forth.

15. In a machine for the manufacture of glass articles, the combination of a fixed central column, a framework rotatable about the said central column, a lever of the first order pivoted to the said framework, a sectional parison mold, the sections of which are pivotally carried in fixed relation to the outer arm of the said lever, a counterbalance weight in connection with the inner end of the said lever, a vertical box cam carried by the said fixed column, and a follower to said cam, carried in connection with the inner end of the said lever, for the purposes set forth.

16. In a machine for the manufacture of glass articles, the combination of a rotatable framework, a lever of the first order pivoted to the said framework, a sectional parison mold, the sections of which are pivotally carried in fixed relation to the outer arm of the said lever, a weight slidable in relation to a guide so that it can rise and fall vertically in the said framework, a horizontal channel in the said weight within which the inner end of the said lever is adapted to slide, and means for raising and lowering the weight at appropriate times, for the purposes set forth.

17. In a machine for the manufacture of glass articles, the combination of a fixed central column, a framework rotatable about the said central column, a secondary frame adapted to slide vertically in the said framework, for the purpose of adjusting the machine for various lengths of parison molds and for various levels of molten glass, a lever of the first order pivoted to the said frame, a sectional parison mold, the sections of which are pivotally carried in fixed relation to the outer arm of the said lever, a vertical slide in the said framework, a counterbalance weight slidable with reference to the said slide and provided with a horizontal slotted opening engaging the inner end of said lever, a vertical box cam in connection with the fixed central column, a cam follower in connection with the said sliding weight, and means for vertically adjusting the said cam follower with reference to the sliding weight, substantially as and for the purposes set forth.

18. In a machine for the manufacture of glass articles, the combination of a rotatable framework, a lever of the first order pivoted to the said framework, a sectional parison mold, the sections of which are pivotally carried in fixed relation to the outer arm of the said lever, a counterbalance weight in connection with the inner arm of the said lever, means in connection with the said arm of the said lever for lowering and raising the parison mold, and means for opening and closing the said parison mold at appropriate times, substantially as described.

19. In a machine for the manufacture of glass articles, the combination of a fixed central column, a framework rotatable about the said central column, a lever of the first order pivoted to the said framework, a sectional parison mold, the sections of which are pivotally carried in fixed relation to the outer arm of the said lever, a counterbalance weight in connection with the inner end of the said lever, means for lowering and raising the parison mold, and means for opening and closing said parison mold at appropriate times, for the purposes set forth.

20. In a machine for the manufacture of glass articles, the combination of a fixed central column, a framework rotatable about the said central column, a secondary frame adapted to slide vertically with respect to the said framework, in order to adjust the machine for different lengths of parison molds and for different levels of molten glass, means for adjusting the said secondary frame and for retaining it in various vertical positions, a lever of the first order pivoted to the said secondary frame, a sectional parison mold, the sections of which are pivotally carried in fixed relation to the outer arm of the said lever, a counterbalance weight in connection with the inner arm of the said lever, means in connection with the said inner arm of the said lever for lowering and raising the parison mold, link mechanism for opening and closing the said parison mold, an arm in connection with and adapted to operate the said link mechanism, a depending arm pivoted to the rotatable framework of the machine, a tapering slot at the lower end of the said arm, means on said arm engaging the said tapering slot, a horizontal box cam in connection with the said central column, and a follower to the said cam, connected to the said depending arm, substantially as described.

In testimony whereof, I have hereunto subscribed my name.

ROBERT FREDERICK HALL.